Patented July 31, 1945

2,380,658

UNITED STATES PATENT OFFICE 2,380,658

COMPOSITION OF MATTER

Rush F. McCleary and John R. Morris, Beacon, N. Y., assignors to The Texas Company, New York, N. Y., a corporation of Delaware No Drawing. Original application June 5, 1942, Serial No. 445,962. Divided and this application January 6, 1943, Serial No. 471,495

7 Claims. (Cl. 260—429)

This invention relates to a metal xanthate of an oil-soluble sulfurized phenolic composition derived from the oils extracted from the Anacardium genus of the Anacardiaceae family.

This application is a division of the invention as described and claimed in the copending application of Rush F. McCleary and John R. Morris, Serial No. 445,962, filed June 5, 1942.

The compositions of the present invention are prepared from the extracted oils obtained from the Anacardium genus of the Anacardiaceae family and include the compositions and constituents of such oils as cashew nut shell oil, marking nut shell oil, Japanese lac, etc. It is the consensus of the authorities on these extracted oils that the chemical compositions thereof consist primarily of various types of aromatic derivatives such as anacardic acid ($C_{22}H_{32}O_3$), cardol ($C_{22}H_{32}O_4$), cardanol ($C_{20}H_{32}O$), anacardol ($C_{18}H_{30}O$) and urushiol ($C_{20}H_{30}O_2$).

The phenolic compositions to which this invention applies are those oil-soluble phenols which exist in the naturally occurring Anacardium oils or are formed by the decomposition of other aromatic derivatives present in the oils. These oil-soluble phenols are usually mono- or dihydric phenols possessing long chain unsaturated alkyl groups attached to the nucleus.

The naturally occurring cashew nut shell oil is described as containing approximately 90% anacardic acid and 10% cardol. Neither of these constituents is applicable to the present invention in that the anacardic acid fraction contains a carboxylic group and the cardol fraction, while described as a phenolic composition, is relatively oil-insoluble.

The commercially available cashew nut shell oil which is obtained by a thermal extraction process consists primarily of a mixture of anacardic acid, cardanol and cardol with cardanol predominating. The cardanol fraction which does not appear in the naturally occurring oil is presumed to be a degradation product of anacardic acid and the amounts of cardanol present in the commercial oil depend upon the degree of heat used in the extraction process. Upon distillation of the commercial cashew nut shell oil, an oil-soluble distillate is obtained which consists almost entirely of cardanol. Cardanol distills over as an oil-soluble light-colored liquid at approximately 225° C. and 10 mm. mercury and is described as a phenol possessing an unsaturated alkyl radical of 14 carbon atoms in the meta position. This compound is very unstable and upon heating forms condensation and polymerization products together with copolymers.

In addition to the cardanol, the distillate obtained contains a lower boiling fraction possessing a nicotine-like odor which rapidly darkens when exposed to the atmosphere. This fraction, which amounts to about 5% of the original oil, contains approximately 0.64% nitrogen. If desired, this lower boiling fraction may be removed by fractional distillation.

The following physical constants were obtained on two distillates of the commercially available thermal extracted cashew nut shell oil, one being obtained by vacuum distillation at 10 mm. mercury (A), and the other by steam distillation at atmospheric pressure (B):

|  | A | B |
|---|---|---|
| Bromine No | 135 | 118 |
| Hydroxyl No | 183 | 181 |
| Neutralization No | 6 | 3.5 |
| Saponification No |  | 8.4 |
| Per cent sulfur | 0.10 | 0.10 |

It has been discovered that the addition of small quantities of an oil-soluble or oil-miscible metal xanthate of an oil-soluble sulfurized phenolic composition obtained or derived from the Anacardium genus of the Anacardiaceae family to a refined hydrocarbon oil provides a lubricant, or a compounding lubricant, possessing enhanced anti-oxidant and anti-corrosive properties, together with a lowered pour point. The resulting lubricating compositions containing small proportions of these compounds are described and claimed in the copending application of Rush F. McCleary and John R. Morris, Serial No. 445,962, filed June 5, 1942.

The particular metals which may be used to form the metal derivatives of the present invention include any of the following metals: sodium, potassium, lithium, calcium, barium, strontium, tin, bismuth, aluminum, zinc, magnesium, cadmium, lead, titanium, antimony, chromium, manganese, iron, cobalt, nickel and copper, with preference given to the alkaline earth metals and tin and zinc.

In preparing the sulfurized metal xanthates of the present invention it has been found preferable to first sulfurize the unsaturated constituents of the phenolic compositions, then prepare the metal salt thereof and finally react the metal salt of the sulfurized phenol with carbon disulfide under pressure. This particular sequence of reactions is not critical to the preparation of these compositions and any of the classical methods of synthesis may be used which will result in the compounds herein described.

In all these reactions particular care must be taken to avoid the polymerization and condensation reactions characteristic of these phenols. It has been found that by partially hydrogenating the unsaturated alkyl radicals, these undesirable reactions are avoided and the partially hydrogenated product is sufficiently stable to proceed with any of the foregoing reactions. These hydrogenation reactions do not completely hydrogenate the unsaturated alkyl radical and a sufficient degree of unsaturation is left which enables the composition to take on sulfur in the sulfurization reaction.

The following example illustrates one of the methods of preparing the sulfurized metal xanthates of the present invention:

*Example*

400 ccs. of cardanol with a bromine number of 104–105 was partially hydrogenated in an Adkins type hydrogenation bomb using a Raney nickel catalyst under 2000 pounds pressure. The resulting partially hydrogenated cardanol analyzed as follows:

| | |
|---|---|
| Bromine No | 64–65 |
| Hydroxyl No | 182–177 |
| Percent sulfur | None |

To 285 grams of the partially hydrogenated cardanol were added 315 grams of 300 Pale oil and 28 grams of elemental sulfur. The mixture was heated with stirring at 150–160° C. for six hours and then cooled. To 314 grams of the concentrate of the sulfurized partially hydrogenated cardanol in the Pale oil were added 50 grams of barium hydroxide and 300 ccs. of toluene. This mixture was refluxed under an automatic water separator until no more water came off and then cooled, filtered and the solvent removed by stripping.

This product which was a 50% concentrate of barium salt of sulfurized partially hydrogenated cardanol in Pale oil analyzed as follows:

| | |
|---|---|
| Percent barium | 9.9–10.0 |
| Percent sulfur | 3.4 |

325 grams of the concentrate were charged to a bomb with 325 ccs. of carbon disulfide. The bomb was heated to 110–120° C. under a pressure of 75 pounds per square inch for 1½ hours after which the heat was cut off and the bomb rocked for seven hours. The contents of the bomb were then cooled, washed out with carbon disulfide and stripped of solvent. The analysis of the resulting barium xanthate of sulfurized partially hydrogenated cardanol in a 50% concentrate of 300 Pale oil was as follows:

| | |
|---|---|
| Percent barium | 10.0–10.2 |
| Percent sulfur | 7.0 |

Obviously many modifications and variations of the invention, as hereinbefore set forth, may be made without departing from the spirit and scope thereof and, therefore, only such limitations should be imposed as are indicated in the appended claims.

We claim:
1. A metal xanthate of sulfurized cardanol.
2. A metal xanthate of sulfurized partially hydrogenated cardanol.
3. A metal xanthate of a sulfurized partially hydrogenated phenol obtained from distilled cashew nut shell oil.
4. An alkaline earth metal xanthate of sulfurized partially hydrogenated cardanol.
5. A tin xanthate of sulfurized partially hydrogenated cardanol.
6. A metal xanthate of an oil-soluble sulfurized phenol derived from a member of the class consisting of cashew nut shell oil, marking nut shell oil and Japanese lac.
7. A metal xanthate of an oil-soluble sulfurized partially hydrogenated phenol derived from a member of the class consisting of cashew nut shell oil, marking nut shell oil and Japanese lac.

RUSH F. McCLEARY.
JOHN R. MORRIS.